(12) United States Patent
Lawless, III et al.

(10) Patent No.: US 11,267,178 B2
(45) Date of Patent: Mar. 8, 2022

(54) CLOSED LOOP CONTROL FOR INJECTION MOLDING PROCESSES

(71) Applicant: IMFLUX INC., Hamilton, OH (US)

(72) Inventors: William Francis Lawless, III, Medford, MA (US); Gene Michael Altonen, West Chester, OH (US)

(73) Assignee: IMFLUX INC., Hamilton, OH (US)

( * ) Notice: Subject to any disclaimer, the term of this patent is extended or adjusted under 35 U.S.C. 154(b) by 224 days.

(21) Appl. No.: 16/562,592

(22) Filed: Sep. 6, 2019

(65) Prior Publication Data

US 2020/0078998 A1 Mar. 12, 2020

Related U.S. Application Data

(60) Provisional application No. 62/728,292, filed on Sep. 7, 2018.

(51) Int. Cl.
*B29C 45/76* (2006.01)
*B29C 45/77* (2006.01)

(52) U.S. Cl.
CPC ............ *B29C 45/762* (2013.01); *B29C 45/77* (2013.01); *B29C 2945/76006* (2013.01); *B29C 2945/7621* (2013.01); *B29C 2945/76187* (2013.01)

(58) Field of Classification Search
USPC ....................................................... 264/40.1
See application file for complete search history.

(56) References Cited

U.S. PATENT DOCUMENTS

| 5,013,231 A * | 5/1991 | Fujita ................. B29C 45/5092 264/294 |
| 2010/0295199 A1 | 11/2010 | Zhang et al. |
| 2015/0084221 A1 * | 3/2015 | Oomori .............. B29C 45/7646 264/40.1 |
| 2016/0279852 A1 | 9/2016 | Fitzpatrick |
| 2017/0312954 A1 * | 11/2017 | Nobuta ................... B29C 45/76 |
| 2018/0169921 A1 * | 6/2018 | Schiffers ................. B29C 45/62 |

FOREIGN PATENT DOCUMENTS

WO  WO-2011/103676 A1  9/2011

OTHER PUBLICATIONS

International Application No. PCT/US2019/049836, International Search Report and Written Opinion, dated Nov. 4, 2019.

* cited by examiner

*Primary Examiner* — Matthew J Daniels
*Assistant Examiner* — Paul Spiel
(74) *Attorney, Agent, or Firm* — Marshall, Gerstein & Borun LLP (57) ABSTRACT

Systems and approaches for controlling an injection molding machine having a mold forming a mold cavity and being controlled according to an injection cycle include extruding a molten polymer according to an extrusion profile and measuring at least one variable during the extrusion profile with a first sensor. At least one extrusion operational parameter is adjusted based on the measured variable. The extrusion profile is terminated upon the molten polymer exceeding a first threshold, and the molten polymer is injected into the mold cavity according to an injection profile via a screw that moves from a first position to a second position. Upon completion of the injection profile, a recovery profile commences in which the screw is moved to the first position.

11 Claims, 7 Drawing Sheets

CLOSED LOOP CONTROL FOR INJECTION MOLDING PROCESSES

CROSS REFERENCE TO RELATED APPLICATIONS

This application claims the benefit of U.S. Provisional Application No. 62/728,292, filed on Sep. 7, 2018, the entirety of which is herein expressly incorporated by reference.

FIELD OF THE DISCLOSURE

The present disclosure relates generally to injection molding and, more particularly, to approaches for controlling injection molding machines using specific pressure profiles for intermittent extrusion and/or injection.

BACKGROUND

Injection molding is a technology commonly used for high-volume manufacturing of parts constructed of thermoplastic materials. During repetitive injection molding processes, a thermoplastic resin, typically in the form of small pellets or beads, is introduced into an injection molding machine which melts the pellets under heat and pressure. In an injection cycle, the molten material is forcefully injected into a mold cavity having a particular desired cavity shape. The injected plastic is held under pressure in the mold cavity and is subsequently cooled and removed as a solidified part having a shape closely resembling the cavity shape of the mold. A single mold may have any number of individual cavities which can be connected to a flow channel by a gate that directs the flow of the molten resin into the cavity. A typical injection molding procedure generally includes four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold. Upon ejecting the part from the mold, the device that injects the melted plastic into the mold cavity or cavities (e.g., a screw or an auger) enters a recovery phase in which it returns to an original position.

In these systems, a control system controls the injection molding process according to an injection cycle that defines a series of control values for the various components of the injection molding machine. For example, the injection cycle can be driven by a fixed and/or a variable melt pressure profile wherein the controller uses (for example) sensed pressures at a nozzle as the input for determining a driving force applied to the material. The injection cycle may also be controlled by a fixed or variable screw velocity profile wherein the control senses the velocity of the injection screw as input for determining the driving speed applied to the material.

In certain cases, the total volume of plastic that is required to manufacture a part exceeds the total volume of plastic that can be generated by a reciprocating screw for a particular injection unit. For example, thick parts may have a normal range of volume that can exceed the amount of plastic that can be generated by the screw. The size of an injection molding machine that is required to mold a specific part is based on the projected "shadow area" of the part combined with a multiplier for a specific material. This calculation yields a theoretical force (in tons) that is required to keep the mold from opening during injection of the plastic. Based on the particular tonnage of a machine, the manufacturers of injection molding machines typically have a small range of options for size of injection units. The options offered will cover almost any part that would be required to be molded in the machine. If the part that is being molded requires more volume of plastic than is possible with any of the standard options, one solutions includes retrofitting the machine with a custom injection unit. Due to a number of factors, including carriage travel, available space and safety, to name few, the cost to retrofit a machine is often cost prohibitive.

Some conventional molding machines have options which avoid the need for a larger injection unit by allowing partial filling of the mold cavity with extrusion of the plastic material in combination with injection. However, the method of control during the extrusion portion of filling is based on the variables of screw RPM, screw back pressure, and time. Accordingly, there is no control of actual plastic melt pressure, thus allowing for inconsistency during this portion of filling the mold cavity. In addition, controlling based on time can be unreliable, since any change in material viscosity will change the amount of plastic that is introduced into the mold cavity.

SUMMARY

Embodiments within the scope of the present invention are directed to the control of injection molding machines to produce repeatably consistent parts by using machine parameters and measurements to ensure the molten plastic material being extruded, extruded and subsequently injected, or injected and subsequently extruded into a mold cavity maintains a desired viscosity (and/or density) value and/or falls within a specified allowable range of viscosity (and/or density) values. Systems and approaches for controlling the injection molding machine having a mold forming a mold cavity and being controlled according to an injection cycle include extruding a molten polymer according to an extrusion profile and measuring at least one variable during the extrusion profile with a first sensor. At least one extrusion operational parameter is adjusted based on the measured variable. The extrusion profile is terminated upon the molten polymer exceeding a first threshold, and the molten polymer is injected into the mold cavity according to an injection profile via a screw that moves from a first position to a second position. Upon completion of the injection profile, a recovery profile commences in which the screw is moved to the first position. In some examples, the screw is also maintained at the first position during the extrusion profile.

In some examples, a second sensor is also used to measure at least one additional variable during the recovery profile. At least one injection operational parameter is adjusted based on the at least one additional measured variable measured from the second sensor during the recovery profile.

In some approaches, the at least one extrusion operational parameter is in the form of at least one of a back pressure set point, a screw rotational speed value, or a measured plastic flow front position. The at least one variable may be in the form of a pressure value of molten polymer being urged towards a nozzle of the screw. In some forms, the sensor is located at a leading end of the screw near the nozzle. The sensor may alternatively be located at any position ahead of a check ring of the screw.

In some approaches, the at least one variable may be in the form of a nozzle pressure. The at least one extrusion operational parameter may be in the form of an adjustable back pressure having a plurality of discrete set points. The back pressure may be adjusted according to the sensed nozzle pressure. In other approaches, the at least one extrusion operational parameter is in the form of a continuously variable back pressure.

In some examples, the first threshold is in the form of a melt flow front position. The position of the melt flow front may be determined by at least one of a sensor or an algorithm. In any number of aspects, the injection profile commences after termination of the extrusion profile. In other aspects, the injection profile commences during the extrusion profile. In yet other aspects, the extrusion profile commences after termination of the injection profile.

In accordance with another aspect, an injection molding machine may include an injection unit having a mold forming a mold cavity and a screw that moves from a first position to a second position, a controller adapted to control operation of the injection molding machine according to an injection cycle, and a first sensor coupled to the injection molding machine and the controller. The injection unit is adapted to receive and inject a molten plastic material into the mold cavity via the screw to form a molded part. The first sensor is adapted to measure at least one variable during an extrusion profile. The controller is adapted to adjust during the extrusion profile, at least one extrusion operational parameter of the injection molding machine based on the at least one measured variable measured from the first sensor and terminate the extrusion profile upon the molten polymer exceeding a first threshold. Further, the controller is adapted to inject the molten polymer into the mold cavity according to an injection profile using a screw that moves from a first position to a second position. Upon completion of the injection profile, the controller commences a recovery profile where the screw is moved to the first position.

In accordance with another aspect, systems and approaches for controlling the injection molding machine having a mold forming a mold cavity and being controlled according to an injection cycle include extruding a molten polymer according to an extrusion profile and measuring at least one variable during the extrusion profile with a first sensor. At least one extrusion operational parameter is adjusted based on the measured variable. The extrusion profile is terminated upon the molten polymer exceeding a first threshold.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale. For example, the dimensions and/or relative positioning of some of the elements in the figures may be exaggerated relative to other elements to help to improve understanding of various embodiments of the present invention.

DETAILED DESCRIPTION

Generally speaking, aspects of the present disclosure include systems and approaches for controlling an injection molding machine where operational parameters are adjusted to ensure a consistent volume of injected plastic at a consistent molten material viscosity. In these systems and approaches, upon initiation of the injection cycle, an extrusion profile commences which is then followed by an injection profile and a recovery profile. Each profile is at least partially dependent on a desired operational pattern (i.e., in a closed loop manner) that is indicative of (and/or results in) high quality parts that remain within desired dimensional tolerances. Accordingly, the system can adjust operational parameters of the extrusion, injection, and/or recovery processes as needed in order for its output to match that of the operational pattern. As used herein, the phrase "commencing a pattern recognition portion of the extrusion portion" means a controller commences the operations that cause the injection molding machine to operate in a manner that depends on the desired operational extrusion profile or pattern. Likewise, the phrase "commencing a pattern recognition portion of the injection portion" means a controller commences the operations that cause the injection molding machine to operate in a manner that depends on the desired operational injection profile or pattern. Finally, the phrase "commencing a pattern recognition portion of the recovery portion" means a controller commences the operations that cause the injection molding machine to operate in a manner that depends on the desired operational recovery profile or pattern.

In some examples, the operational pattern may be in the form of an operational graphical curve that can be identified during a validation phase. One such example of a suitable operational graphical curve is an extrusion melt pressure curve during extrusion, which in some forms may simply be a single set point. Because the back pressure exerted on the screw impacts the melt pressure of the extruded molten plastic material, by measuring and adjusting the back pressure, the melt pressure of the molten plastic material may be controlled. The extrusion melt pressure curve may have a correlation to an ideal volume of the molten plastic material that flows into the mold cavity. As will be discussed in further detail below, the system may adjust operational parameters of the injection molding machine in order for its output to match that of the previously identified extrusion melt pressure curve. By ensuring the machine's output during the extrusion portion matches the extrusion melt pressure curve, the described system will in turn ensure that the volume remains constant or near-constant; meaning in a subsequent injection cycle, the plastic material will begin with uniform or near-uniform volumes, thereby limiting or reducing changes to the quality of the molded part.

In an ideal environment, a closed loop method of extruding plastic into a mold cavity using an actual plastic melt pressure measurement in front of the screw tip to control the back pressure would be implemented. Further, by using the actual plastic flow front position or proxy instead of time to end the extrusion part of filling the mold cavity may provide additional benefits.

Figure 1:
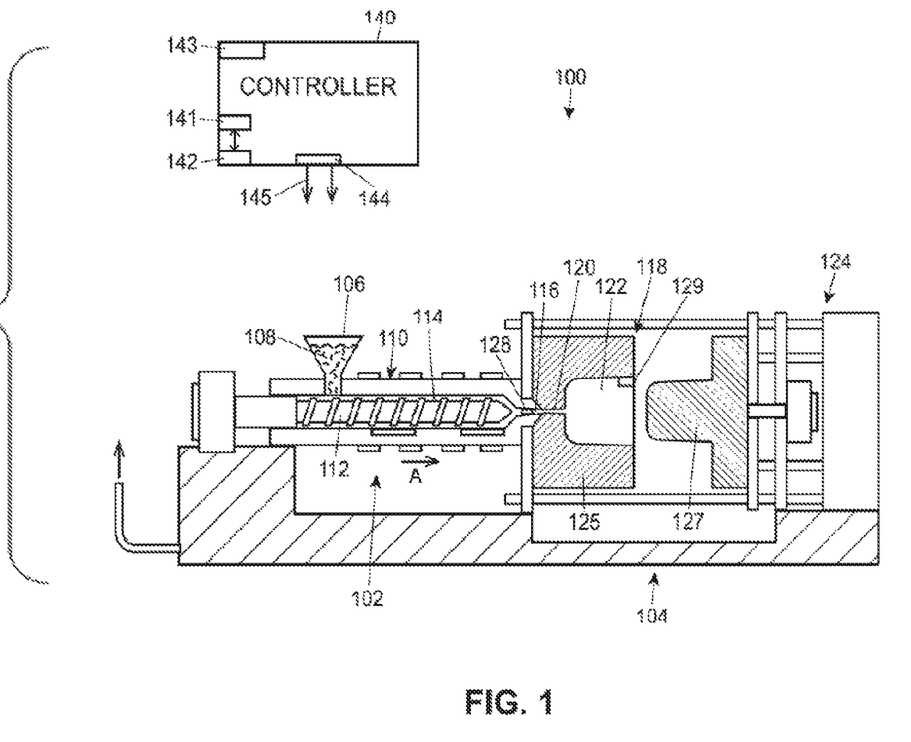
FIG. 1 illustrates a schematic view of an example first injection molding machine having a controller coupled thereto in accordance with various embodiments of the present disclosure.

Turning to the drawings, an injection molding process is herein described. The approaches described herein may be suitable for electric presses, servo-hydraulic presses, hydraulic presses, and other known machines. As illustrated in FIG. 1, the injection molding machine 100 includes an injection unit 102 and a clamping system 104. The injection unit 102 includes a hopper 106 adapted to accept material in the form of pellets 108 or any other suitable form. In many of these examples, the pellets 108 may be a polymer or polymer-based material. Other examples are possible.

The hopper 106 feeds the pellets 108 into a heated barrel 110 of the injection unit 102. Upon being fed into the heated barrel 110, the pellets 108 may be driven to the end of the heated barrel 110 by a reciprocating screw 112. The heating of the heated barrel 110 and the compression of the pellets 108 by the reciprocating screw 112 causes the pellets 108 to melt, thereby forming a molten plastic material 114. The molten plastic material 114 is typically processed at a temperature selected within a range of about 130° C. to about 410° C. (with manufacturers of particular polymers typically providing injection molders with recommended temperature ranges for given materials).

The reciprocating screw 112 advances forward from a first position 112a to a second position 112b and forces the molten plastic material 114 toward a nozzle 116 to form a shot of plastic material that will ultimately be injected into a mold cavity 122 of a mold 118 via one or more gates 120 which direct the flow of the molten plastic material 114 to the mold cavity 122. In other words, the reciprocating screw 112 is driven to exert a force on the molten plastic material 114. In other embodiments, the nozzle 116 may be separated from one or more gates 120 by a feed system (not illustrated). The mold cavity 122 is formed between the first and second mold sides 125, 127 of the mold 118 and the first and second mold sides 125, 127 are held together under pressure via a press or clamping unit 124.

The press or clamping unit 124 applies a predetermined clamping force during the molding process which is greater than the force exerted by the injection pressure acting to separate the two mold halves 125, 127, thereby holding together the first and second mold sides 125, 127 while the molten plastic material 114 is injected into the mold cavity 122. To support these clamping forces, the clamping system 104 may include a mold frame and a mold base, in addition to any other number of components, such as a tie bar.

Once the shot of molten plastic material 114 is injected into the mold cavity 122, the reciprocating screw 112 halts forward movement. The molten plastic material 114 takes the form of the mold cavity 122 and cools inside the mold 118 until the plastic material 114 solidifies. Upon solidifying, the press 124 releases the first and second mold sides 115, 117, which are then separated from one another. The finished part may then be ejected from the mold 118. The mold 118 may include any number of mold cavities 122 to increase overall production rates. The shapes and/or designs of the cavities may be identical, similar to, and/or different from each other. For instance, a family mold may include cavities of related component parts intended to mate or otherwise operate with one another. In some forms, an "injection cycle" is defined as of the steps and functions performed between commencement of injection and ejection. Upon completion of the injection cycle, a recovery profile is commenced during which the reciprocating screw 112 returns to the first position 112a.

The injection molding machine 100 also includes a controller 140 communicatively coupled with the machine 100 via connection 145. The connection 145 may be any type of wired and/or wireless communications protocol adapted to transmit and/or receive electronic signals. In these examples, the controller 140 is in signal communication with at least one sensor, such as, for example, sensor 128 located in or near the nozzle 116 and/or a sensor 129 located in or near the mold cavity 122. In some examples, the sensor 128 is located at a leading end of the screw 112 and the sensor 129 is located in a manifold or a runner of the injection machine 100. Alternatively, the sensor 128 may be located at any position ahead of the check ring of the screw 112. It is understood that any number of additional real and/or virtual sensors capable of sensing any number of characteristics of the mold 118 and/or the machine 100 may be used and placed at desired locations of the machine 100. As a further example, any type of sensor capable of detecting flow front progression in the mold cavity 122 may be used.

The controller 140 can be disposed in a number of positions with respect to the injection molding machine 100. As examples, the controller 140 can be integral with the machine 100, contained in an enclosure that is mounted on the machine, contained in a separate enclosure that is positioned adjacent or proximate to the machine, or can be positioned remote from the machine. In some embodiments, the controller 140 can partially or fully control functions of the machine via wired and/or wired signal communications as known and/or commonly used in the art.

The sensor 128 may be any type of sensor adapted to measure (either directly or indirectly) one or more characteristics of the molten plastic material 114 and/or portions of the machine 100. The sensor 128 may measure any characteristics of the molten plastic material 114 that are known and used in the art, such as, for example, a back pressure, temperature, viscosity, flow rate, hardness, strain, optical characteristics such as translucency, color, light refraction, and/or light reflection, or any one or more of any number of additional characteristics which are indicative of these. The sensor 128 may or may not be in direct contact with the molten plastic material 114. In some examples, the sensor 128 may be adapted to measure any number of characteristics of the injection molding machine 100 and not just those characteristics pertaining to the molten plastic material 114. As an example, the sensor 128 may be a pressure transducer that measures a melt pressure (during the injection cycle) and/or a back pressure (during the extrusion profile and/or recovery profile) of the molten plastic material 114 at the nozzle 116.

As previously noted, the sensor 128 may measure a back pressure exerted on the screw 112, but unlike in conventional systems where back pressure is measured on a trailing end of the screw 112, in the present approaches, back pressure is measured on a leading end of the screw 112. This positioning allows the sensor 128 to accurately measure the compressive pressure on the molten plastic material 114 as compared to measurements obtained at the trailing end of the screw 112 due to the compressible nature of the molten plastic material 114, draw in the barrel, and other factors.

The sensor 128 generates a signal which is transmitted to an input of the controller 140. If the sensor 128 is not located within the nozzle 116, the controller 140 can be set, configured, and/or programmed with logic, commands, and/or executable program instructions to provide appropriate correction factors to estimate or calculate values for the measured characteristic in the nozzle 116. For example, as previously noted, the sensor 128 may be programmed to measure a back pressure during a recovery profile. The controller 140 may receive these measurements and may translate the measurements to other characteristics of the molten plastic material 114, such as a viscosity value.

Similarly, the sensor 129 may be any type of sensor adapted to measure (either directly or indirectly) one or more characteristics of the molten plastic material 114 to detect its presence and/or condition in the mold cavity 122. In various embodiments, the sensor 129 may be located at or near an end-of-fill position in the mold cavity 122. The sensor 129 may measure any number of characteristics of the molten plastic material 114 and/or the mold cavity 122 that are known in the art, such as pressure, temperature, viscosity, flow rate, hardness, strain, optical characteristics such as translucency, color, light refraction, and/or light reflection, and the like, or any one or more of any number of additional characteristics indicative of these. The sensor 129 may or may not be in direct contact with the molten plastic material 114. As an example, the sensor 129 may be a pressure transducer that measures a cavity pressure of the molten plastic material 114 within the cavity 122. The sensor 129 generates a signal which is transmitted to an input of the controller 140. Any number of additional sensors may be used to sense and/or measure operating parameters.

The controller 140 is also in signal communication with a screw control 126. In some embodiments, the controller 140 generates a signal which is transmitted from an output of the controller 140 to the screw control 126. The controller 140 can control any number of characteristics of the machine, such as injection pressures (by controlling the screw control 126 to advance the screw 112 at a rate which maintains a desired value corresponding to the molten plastic material 114 in the nozzle 116), barrel temperatures, clamp closing and/or opening speeds, cooling time, inject forward time, overall cycle time, pressure set points, ejection time, screw recovery speed, back pressure values exerted on the screw 112, and screw velocity.

The signal or signals from the controller 140 may generally be used to control operation of the molding process such that variations in material viscosity, mold temperatures, melt temperatures, and other variations influencing filling rate are taken into account by the controller 140. Alternatively or additionally, the controller 140 may make necessary adjustments in order to control for material characteristics such as volume and/or viscosity. Adjustments may be made by the controller 140 in real time or in near-real time (that is, with a minimal delay between sensors 128, 129 sensing values and changes being made to the process), or corrections can be made in subsequent cycles. Furthermore, several signals derived from any number of individual cycles may be used as a basis for making adjustments to the molding process. The controller 140 may be connected to the sensors 128, 129, the screw control 126, and or any other components in the machine 100 via any type of signal communication approach known in the art.

The controller 140 includes software 141 adapted to control its operation, any number of hardware elements 142 (such as, for example, a non-transitory memory module and/or processors), any number of inputs 143, any number of outputs 144, and any number of connections 145. The software 141 may be loaded directly onto a non-transitory memory module of the controller 140 in the form of a non-transitory computer readable medium, or may alternatively be located remotely from the controller 140 and be in communication with the controller 140 via any number of controlling approaches. The software 141 includes logic, commands, and/or executable program instructions which may contain logic and/or commands for controlling the injection molding machine 100 according to a mold cycle. The software 141 may or may not include an operating system, an operating environment, an application environment, and/or a user interface.

The hardware 142 uses the inputs 143 to receive signals, data, and information from the injection molding machine being controlled by the controller 140. The hardware 142 uses the outputs 144 to send signals, data, and/or other information to the injection molding machine. The connection 145 represents a pathway through which signals, data, and information can be transmitted between the controller 140 and its injection molding machine 100. In various embodiments this pathway may be a physical connection or a non-physical communication link that works analogous to a physical connection, direct or indirect, configured in any way described herein or known in the art. In various embodiments, the controller 140 can be configured in any additional or alternate way known in the art.

The connection 145 represents a pathway through which signals, data, and information can be transmitted between the controller 140 and the injection molding machine 100. In various embodiments, these pathways may be physical connections or non-physical communication links that work analogously to either direct or indirect physical connections configured in any way described herein or known in the art. In various embodiments, the controller 140 can be configured in any additional or alternate way known in the art.

Figure 2:
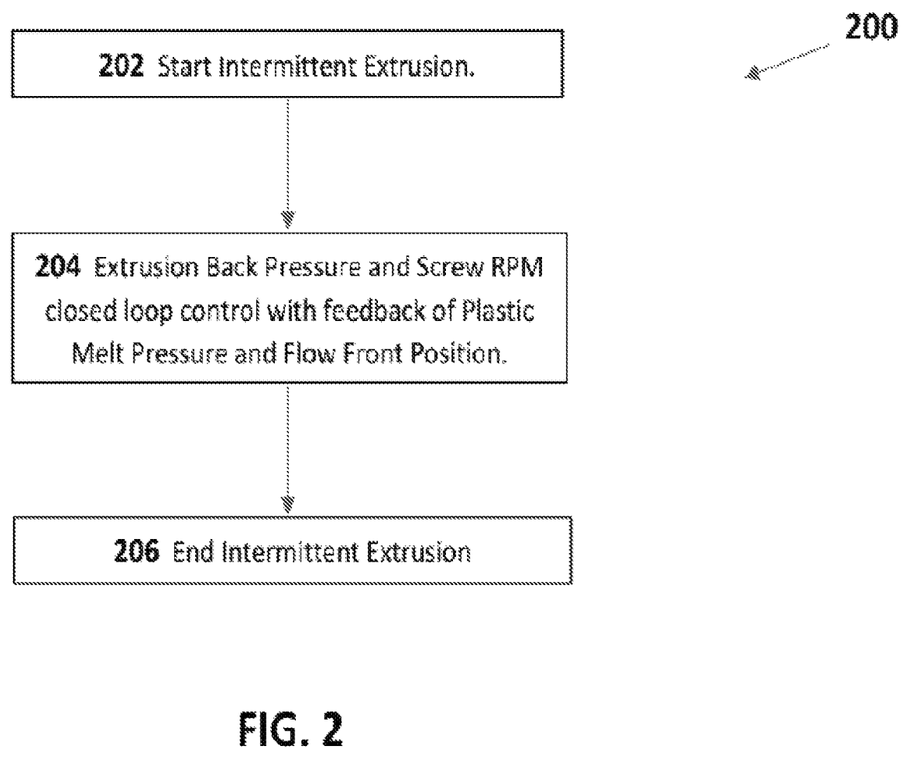
FIG. 2 illustrates an example flow diagram of an intermittent extrusion molding cycle in accordance with various embodiments of the present disclosure.

As illustrated in FIG. 2, an example filling cycle flow diagram 200 of an injection molding machine 100 is depicted that only uses an intermittent extrusion process or profile. At a step 202, the start of intermittent extrusion occurs after the press or clamping unit 124 applies a predetermined clamping force to the two mold halves 125, 127. In step 204, the extrusion back pressure and screw RPM are controlled in a closed loop manner (e.g., by using feedback from plastic melt pressure and real or virtual flow front position readings). During step 204, the mold cavity 122 will be substantially and/or completely filled with molten plastic material 114 while the sensors 128, 129 measure any number of variables such as, for example, plastic melt pressure, back pressure, and flow front positions related to operation of the machine 100. During operation of the intermittent extrusion filling cycle, the controller 140 maintains a constant melt pressure profile which may be stored in the software 141. After the completion of Step 204, the intermittent extrusion ends at step 206.

Figure 3:
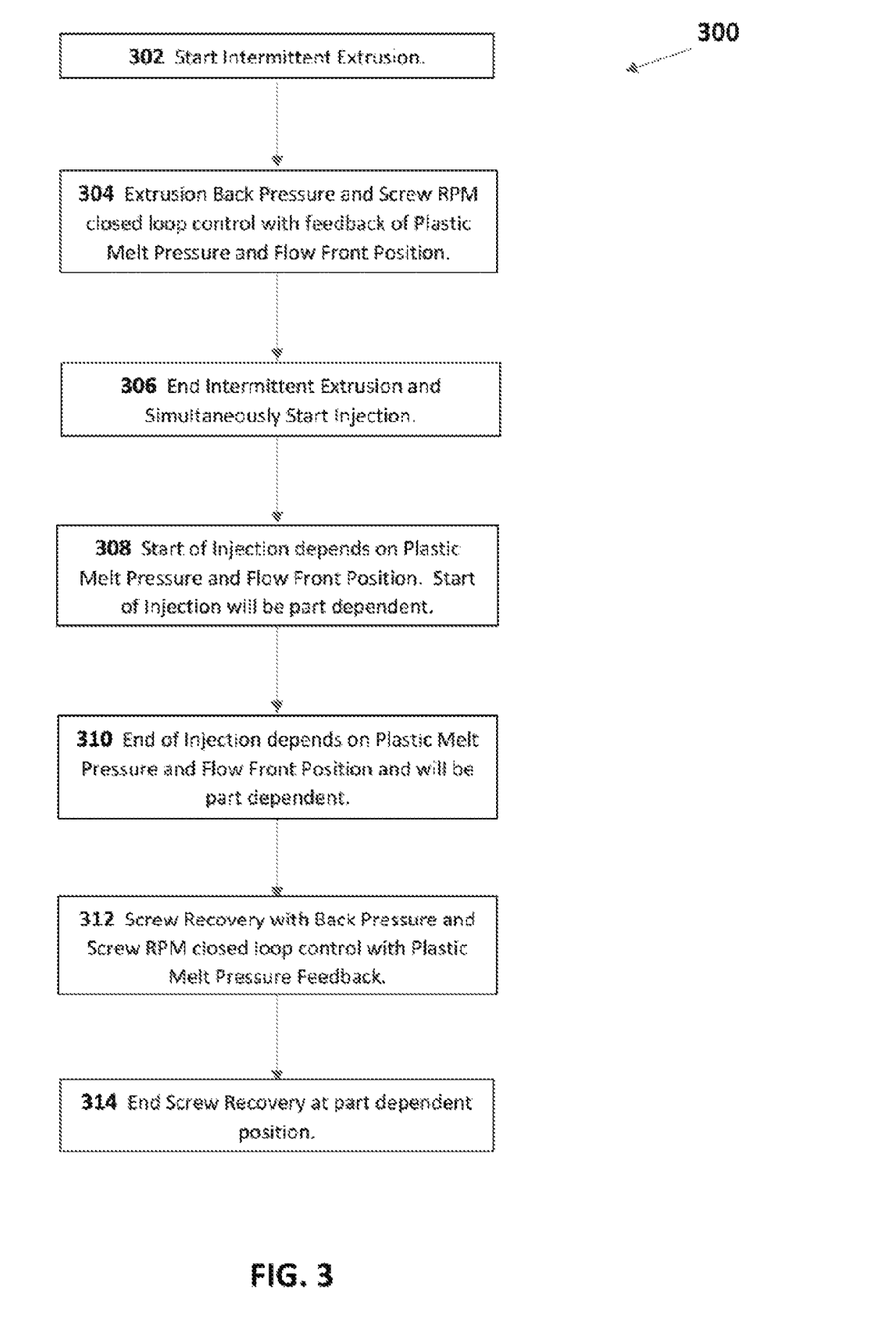
FIG. 3 illustrates an example flow diagram of an intermittent extrusion molding profile followed by an injection profile and a recovery profile in accordance with various embodiments of the present disclosure.

Turning to FIG. 3, an example filling cycle flow diagram 300 of an injection molding machine 100 is depicted that uses an intermittent extrusion process or profile followed by an injection process or profile. At a step 302, the start of intermittent extrusion step 302 occurs after the press or clamping unit 124 applies a predetermined clamping force to the two mold halves 125, 127. In step 304, the extrusion back pressure and screw RPM are controlled in a closed loop manner using feedback from plastic melt pressure and/or real or virtual flow front position readings. During step 304, the mold cavity 122 is partially filled with molten plastic material 114 while sensors 128, 129 measure any number of variables such as plastic melt pressure, back pressure, and flow front position related to operation of the machine 100. During operation of the intermittent extrusion filling cycle, the controller 140 maintains a constant melt pressure profile which may be stored in the software 141. At a step 306, the intermittent extrusion ends while injection simultaneously begins. The start of injection 308 may be part dependent and thus will depend on the values (e.g., the plastic melt pressure and plastic flow front position) measured by sensors 128, 129. During step 308, the mold cavity 122 being will be substantially and/or completely filled with molten plastic material 114 until the end of injection 310. As non-limiting examples, U.S. Provisional Application No. 62/728,272, filed on Sep. 7, 2018, describes approaches for controlling injection molding machines using specific pressure profiles, the entire contents of which are incorporated by reference herein. Upon completing the injection process or profile, at step 312, a backpressure control profile commences with back pressure and screw RPM being controlled during screw recovery. At step 314, the screw recovery process or profile is complete. The duration and characteristics of this step are part dependent.

Figure 4:
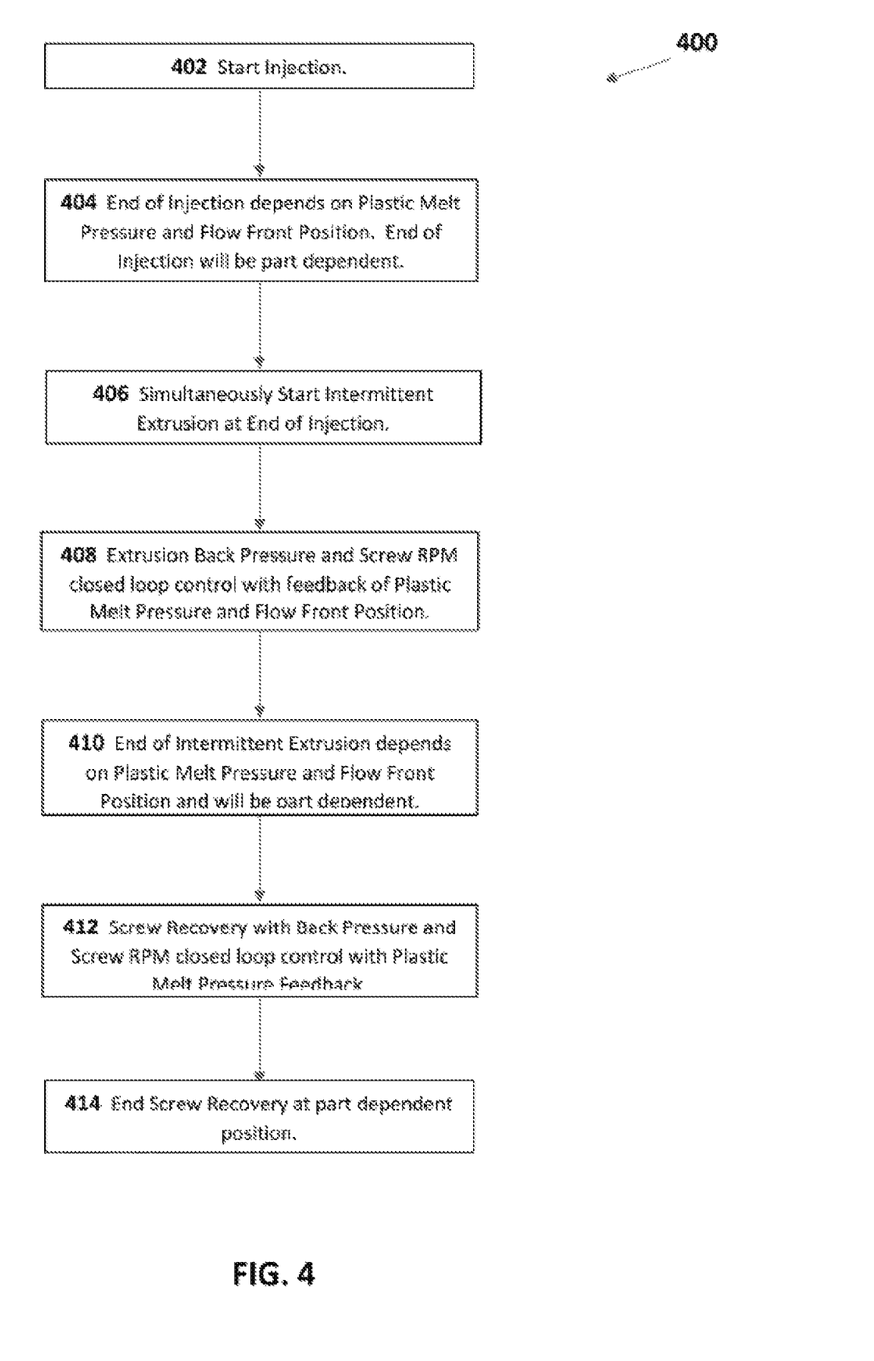
FIG. 4 illustrates an example flow diagram of an injection molding profile followed by an intermittent extrusion profile and a recovery profile in accordance with various embodiments of the present disclosure.

Turning to FIG. 4, an example filling cycle flow diagram 400 of an injection molding machine 100 is depicted that uses an injection process followed by an intermittent extrusion process. At a step 402, the start of injection begins after the press or clamping unit 124 applies a predetermined clamping force to the two mold halves 125, 127. In step 404, the mold cavity 122 is substantially and/or completely filled with molten plastic material 114 until the end of injection (step 406), at which point intermittent extrusion will simultaneously begin. During step 408, the extrusion back pressure and screw RPM are controlled in a closed loop manner using feedback from any number of readings such as plastic melt pressure and real or virtual flow front position readings while cavity 122 is completely filled or packed out with molten plastic material 114. During this time, sensors 128, 129 are adapted to measure any number of variables such as plastic melt pressure, back pressure, and flow front position related to operation of the machine 100. During operation of the intermittent extrusion filling cycle, the controller 140 maintains a constant melt pressure profile which may be stored in the software 141. After the completion of step 408, the intermittent extrusion ends at step 410. The end of intermittent extrusion is part dependent and will depend on the plastic melt pressure and plastic flow front position measured by sensors 128, 129. As previously noted, any number of different approaches for controlling the machine 100 using specific pressure profiles may be used. Upon completion of the intermittent extrusion step 410, a step 412 commences with back pressure and screw RPM control during screw recovery. Step 414 is the completion of screw recovery and is also part dependent.

Figure 5:
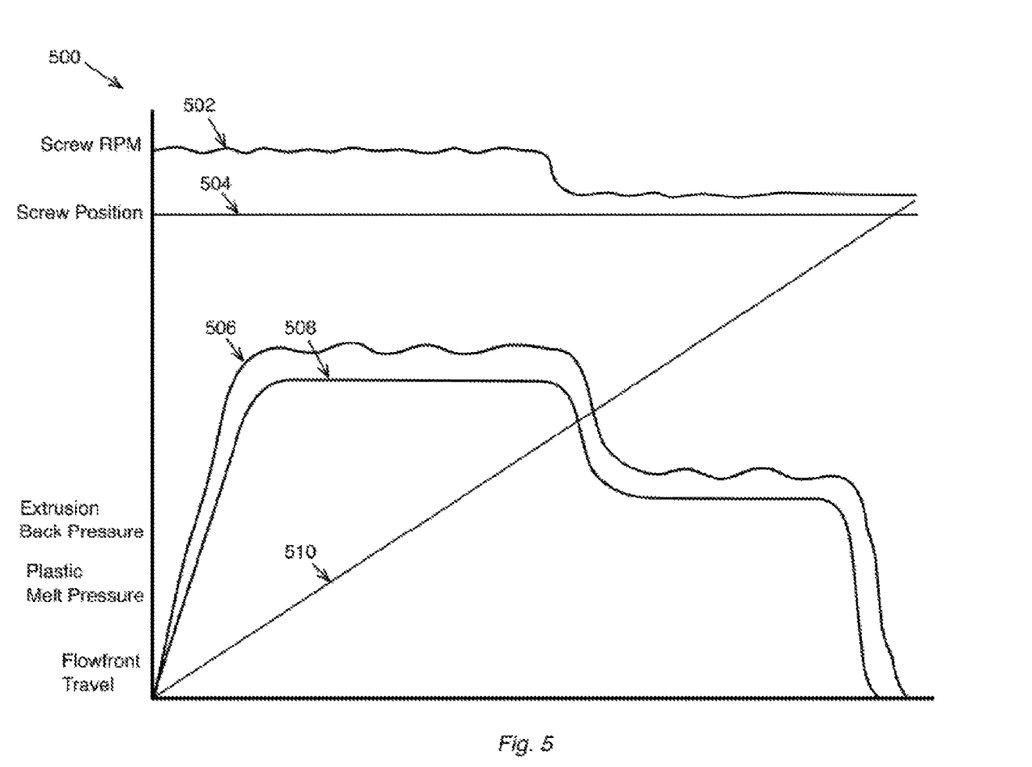
FIG. 5 illustrates a graphical example of an intermittent extrusion molding profile in accordance with various embodiments of the present disclosure.

As illustrated in FIG. 5, an example filling cycle graph 500 of an injection molding machine 100 is depicted that only uses an intermittent extrusion process. The intermittent extrusion process occurs after the press or clamping unit 124 applies a predetermined clamping force to the two mold halves 125, 127. The extrusion back pressure 506 and screw RPM 502 values are controlled in closed loop manner using feedback from plastic melt pressure 508 and real or virtual flow front position 510 readings and are used to maintain a plastic melt pressure profile 508. The plastic flow front travel position 510 within the mold cavity 122 increases until the cavity 122 is substantially and/or completely filled with molten plastic material 114 while sensors 128, 129 are adapted to measure plastic melt pressure 508, back pressure 506 and flow front travel position 510 values related to operation of the machine 100. During operation of the intermittent extrusion filling cycle, the controller 140 maintains a plastic melt pressure profile 508 which may be stored in the software 141. The screw position 504 remains constant during the entire filling cycle.

Figure 6:
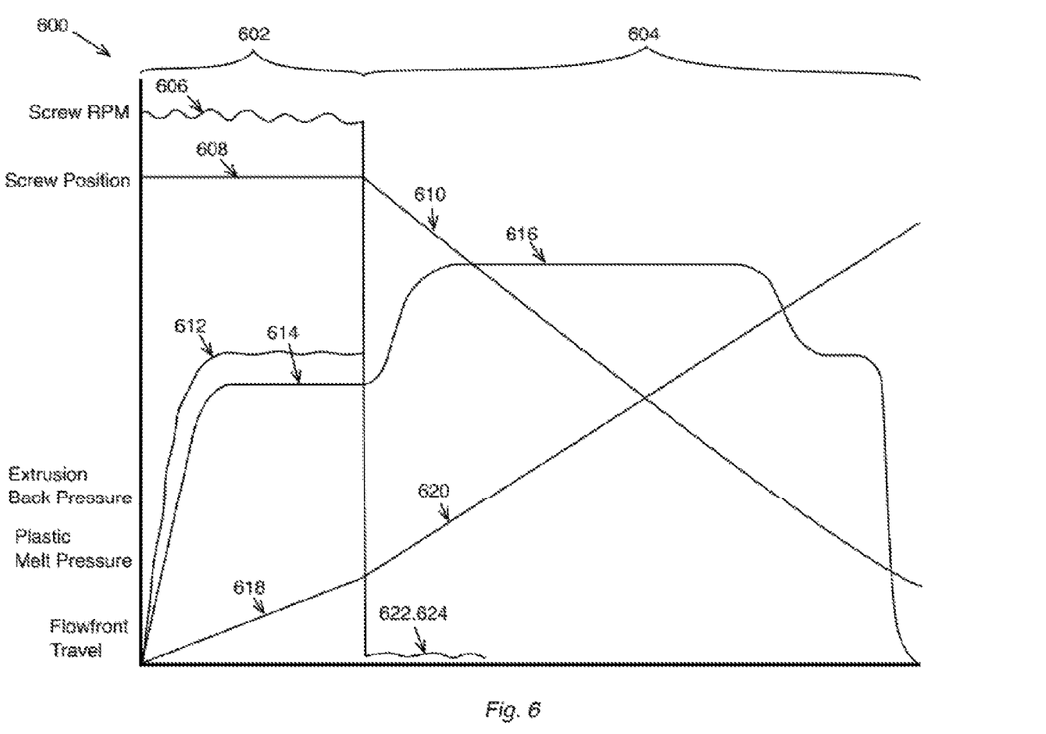
FIG. 6 illustrates a graphical example of an intermittent extrusion molding profile followed by an injection profile and a recovery profile in accordance with various embodiments of the present disclosure.

As illustrated in FIG. 6, an example filling cycle graph 600 of an injection molding machine 100 is depicted that uses an intermittent extrusion process 602 followed by an injection process 604. The intermittent extrusion process 602 occurs after the press or clamping unit 124 applies a predetermined clamping force to the two mold halves 125, 127. The extrusion back pressure 612 and screw RPM 606 values are controlled in a closed loop manner using feedback from plastic melt pressure 614 and real or virtual flow front position readings 618 and are used to maintain a plastic melt pressure profile 614. The plastic flow front travel position 618 within the mold cavity 122 increases until it is partially filled (part dependent) with molten plastic material 114 while sensors 128, 129 are adapted to measure plastic melt pressure 614, back pressure 612 and flow front travel position 618 related to operation of the machine 100.

During operation of the intermittent extrusion filling cycle 602, the controller 140 maintains a plastic melt pressure profile 614 which may be stored in the software 141. The screw position 608 remains constant during the intermittent extrusion filling cycle. After completion of the intermittent extrusion process 602, the injection process 604 starts simultaneously or near-simultaneously. Screw back pressure 622 and screw RPM 624 reduce to a zero value. The start of the injection process 604 is part dependent and will depend on the plastic melt pressure 616 and plastic flow front position 620 measured by sensors 128, 129. The plastic flow front position 620 increases until the mold cavity 122 is substantially and/or completely filled with molten plastic material 114 until the end of the injection process 604. The screw position 610 decreases to a second and final position that is part dependent during the injection process 604. During operation of the injection filling cycle 604, the controller 140 maintains a plastic melt pressure profile 616 which may be stored in the software 141.

Figure 7:
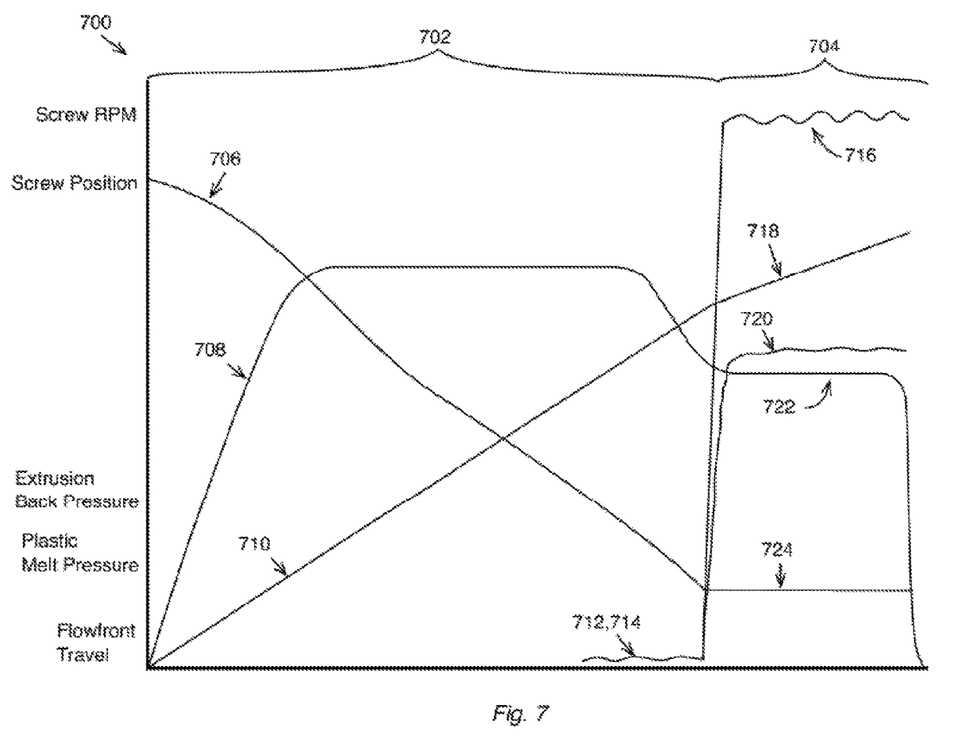
FIG. 7 illustrates a graphical example of an injection molding profile followed by an intermittent extrusion profile and a recovery profile in accordance with various embodiments of the present disclosure.

As illustrated in FIG. 7, an example filling cycle graph 700 of an injection molding machine 100 is depicted using an injection process 702 followed by an intermittent extrusion process 704. The injection process 702 occurs after the press or clamping unit 124 applies a predetermined clamping force to the two mold halves 125, 127. After the start of the injection process 702, the plastic flow front position 710 increases until the mold cavity 122 is substantially filled (part dependent) with molten plastic material 114. The screw position 706 decreases to a second and final position that is part dependent while screw back pressure 712 and screw RPM 714 maintain a zero value during injection 702.

During operation of the injection filling cycle 702, the controller 140 maintains a plastic melt pressure profile 708 which may be stored in the software 141. Upon completion of the injection process 702, the intermittent extrusion process 704 begins simultaneously or near-simultaneously. The extrusion back pressure 720 and screw RPM 716 are controlled in a closed loop manner using feedback from plastic melt pressure 722 and real or virtual flow front position readings 618 and are used to maintain a plastic melt pressure profile 614. The plastic flow front travel position 718 within the mold cavity 122 increases until it is substantially and/or completely filled with molten plastic material 114 while sensors 128, 129 are adapted to measure plastic melt pressure 722, back pressure 720 and flow front travel position 718 related to operation of the machine 100. During operation of the intermittent extrusion filling cycle 704, the controller 140 maintains a plastic melt pressure profile 722 which may be stored in the software 141. The screw position 724 remains constant during the intermittent extrusion filling cycle.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A method for controlling an injection molding machine having a mold forming a mold cavity, the injection molding machine being controlled according to an injection cycle, the method comprising:
    extruding a molten polymer into the mold cavity according to an extrusion profile;
    measuring, using a first sensor, at least one variable during the extrusion profile;
    adjusting at least one extrusion operational parameter of the injection molding machine based on the at least one measured variable measured from the first sensor;
    terminating the extrusion profile upon the molten polymer exceeding a first threshold;
    injecting the molten polymer into the mold cavity according to an injection profile using a screw that moves from a first position to a second position; and
    upon completion of the injection profile, commencing a recovery profile in which the screw is moved to the first position; wherein the injection profile commences after termination of the extrusion profile.

2. The method of claim 1, further comprising: measuring, using a second sensor, at least one additional variable during the recovery profile; and adjusting at least one injection operational parameter of the injection molding machine based on the at least one additional measured variable measured from the second sensor during the recovery profile.

3. The method of claim 1, wherein during the extrusion profile, the screw is maintained at the first position.

4. The method of claim 1, wherein the at least one extrusion operational parameter comprises at least one of a back pressure set point, a screw rotational speed value, or a measured plastic flow front position.

5. The method of claim 1, wherein the at least one variable comprises a pressure value of molten polymer being urged towards a nozzle of the screw.

6. The method of claim 1, wherein the first sensor is located at a leading end of the screw near a nozzle of the screw.

7. The method of claim 1, wherein the first sensor is located at a position ahead of a check ring of the screw.

8. The method of claim 1, wherein the at least one variable comprises a nozzle pressure, and wherein the at least one extrusion operational parameter is in the form of an adjustable back pressure having a plurality of discrete set points, the back pressure being adjusted according to the sensed nozzle pressure.

9. The method of claim 1, wherein the at least one variable comprises a nozzle pressure, and wherein the at least one extrusion operational parameter comprises a continuously variable back pressure, the variable back pressure being adjusted according to the sensed nozzle pressure.

10. The method of claim 1, wherein the first threshold comprises a melt flow front position.

11. The method of claim 10, wherein the position of the melt flow front is determined by at least one of a sensor or an algorithm.

* * * * *